(12) United States Patent
Patrick et al.

(10) Patent No.: US 11,173,745 B2
(45) Date of Patent: Nov. 16, 2021

(54) SINUSOIDAL WHEEL

(71) Applicant: Shark Wheel, Inc., Lake Forest, CA (US)

(72) Inventors: David Patrick, Ladera Ranch, CA (US); Robert Patrick, Plano, TX (US)

(*) Notice: Subject to any disclaimer, the term of this patent is extended or adjusted under 35 U.S.C. 154(b) by 0 days.

(21) Appl. No.: 17/156,462

(22) Filed: Jan. 22, 2021

(65) Prior Publication Data

US 2021/0138831 A1     May 13, 2021

Related U.S. Application Data

(63) Continuation of application No. 16/679,058, filed on Nov. 8, 2019, now Pat. No. 10,899,172, which is a continuation-in-part of application No. 16/181,920, filed on Nov. 6, 2018, now Pat. No. 10,688,824, which is a continuation-in-part of application No.
(Continued)

(51) Int. Cl.
| | | |
|---|---|---|
| *B60B 19/00* | (2006.01) | |
| *B60B 15/00* | (2006.01) | |
| *B60B 15/02* | (2006.01) | |
| *B60B 19/12* | (2006.01) | |
| *B62D 65/12* | (2006.01) | |

(52) U.S. Cl.
CPC .............. *B60B 19/00* (2013.01); *B60B 15/00* (2013.01); *B60B 15/025* (2013.01); *B60B 15/026* (2013.01); *B60B 19/12* (2013.01); *B60Y 2200/15* (2013.01); *B60Y 2200/66* (2013.01); *B62D 65/12* (2013.01)

(58) Field of Classification Search
CPC ....... B60B 19/00; B60B 19/12; B60B 15/026; B60B 15/00; B60B 15/025; B60C 11/02; B60C 11/04; B60C 11/06; B60Y 2200/15; B60Y 2200/66; B62D 65/12
See application file for complete search history.

(56) References Cited

U.S. PATENT DOCUMENTS

| | | |
|---|---|---|
| 694,303 A | 2/1902 | Beskow |
| 740,035 A | 9/1903 | Nichols |
| | (Continued) | |

FOREIGN PATENT DOCUMENTS

| | | |
|---|---|---|
| FR | 2201980 | 5/1974 |
| GB | 263965 | 1/1927 |
| | (Continued) | |

OTHER PUBLICATIONS

Shark Wheel, Shark Wheel on "Nature Knows Best," Published Nov. 7, 2017, YouTube, https://www.youtube.com/watch?v=OQYsxI0jXGA.
(Continued)

*Primary Examiner* — Scott A Browne
(74) *Attorney, Agent, or Firm* — Cionca IP Law P.C.; Marin Cionca

(57) ABSTRACT

A wheel set assembly having a plurality of sinusoidal channeled wheels. The sinusoidal channeled wheels having a sinusoidal channel disposed around a circular exterior surface of each of the sinusoidal channeled wheels. The wheel set assembly allows for better maneuverability and longevity in comparison to other materials handling equipment wheels because of the sinusoidal channels. The sinusoidal channels also provide heat dissipation along with the ability to push debris out of the way of the materials handling equipment.

17 Claims, 15 Drawing Sheets

Related U.S. Application Data

14/953,218, filed on Nov. 27, 2015, now Pat. No. 10,118,439, which is a continuation-in-part of application No. 13/676,790, filed on Nov. 14, 2012, now abandoned.

(56) References Cited

U.S. PATENT DOCUMENTS

| | | | |
|---|---|---|---|
| 851,055 A | 4/1907 | Beskow | |
| 907,991 A | 12/1908 | Goodfellow | |
| 1,081,844 A | 12/1913 | Laurencich | |
| D54,599 S | 6/1919 | Clark | |
| 1,395,734 A | 11/1921 | Root | |
| 1,453,542 A | 5/1923 | Beisel | |
| 1,876,628 A | 10/1926 | Dawe | |
| 2,364,983 A | 12/1944 | Lagasse | |
| 2,372,585 A | 3/1945 | Klumb et al. | |
| 2,618,490 A | 11/1952 | Frischmann | |
| 2,683,495 A | 7/1954 | Kopczynski | |
| 2,786,540 A | 3/1957 | Sfredda | |
| 2,790,503 A | 4/1957 | Kopczynski | |
| 2,819,767 A | 1/1958 | Kopczynski | |
| 2,964,887 A | 12/1960 | Orozco | |
| 3,243,194 A | 3/1966 | Trusock | |
| 3,363,713 A | 1/1968 | Blonsky | |
| 3,717,380 A | 2/1973 | Eastwood, II | |
| 3,852,910 A | 12/1974 | Everett | |
| 3,870,372 A | 3/1975 | Knipp | |
| 4,102,423 A | 7/1978 | Reid | |
| 4,130,320 A * | 12/1978 | Scardenzan | A63C 17/01 301/5.7 |
| 4,133,371 A | 1/1979 | Birch et al. | |
| 4,272,998 A | 6/1981 | F'Geppert | |
| 4,301,616 A | 11/1981 | Gudgel | |
| 4,674,757 A | 6/1987 | Martin | |
| 4,817,747 A | 4/1989 | Kopczynski | |
| 4,979,406 A | 12/1990 | Waller | |
| 5,259,802 A | 11/1993 | Yang | |
| 5,353,485 A | 10/1994 | Billgren | |
| 5,601,491 A | 2/1997 | Chan et al. | |
| 5,697,622 A * | 12/1997 | Warinner | A63C 17/04 188/5 |
| 5,881,831 A | 3/1999 | Harvey | |
| 6,120,356 A | 9/2000 | Jaskowiak et al. | |
| 6,227,622 B1 | 5/2001 | Roderick et al. | |
| 6,244,937 B1 | 6/2001 | Jaskowiak et al. | |
| 6,358,133 B1 | 3/2002 | Cesena et al. | |
| 6,402,342 B1 | 6/2002 | Chiang | |
| 7,090,057 B2 | 8/2006 | Fryska et al. | |
| 7,128,175 B1 | 10/2006 | Martineau | |
| D541,047 S | 4/2007 | Moon | |
| 7,311,318 B1 * | 12/2007 | Funk | A63C 17/22 280/87.042 |
| D576,795 S | 9/2008 | Moon | |
| 7,749,033 B1 | 7/2010 | Paulus | |
| 7,803,031 B1 | 9/2010 | Winckler et al. | |
| 8,002,294 B2 | 8/2011 | Brandeau | |
| 8,020,679 B2 | 9/2011 | Wu | |
| D703,442 S | 4/2014 | Parker | |
| D718,938 S | 12/2014 | Parker | |
| D732,293 S | 7/2015 | Parker et al. | |
| D775,283 S | 12/2016 | Parsley | |
| 10,118,439 B1 | 11/2018 | Patrick | |
| 2005/0116539 A1 | 6/2005 | Jiazheng | |
| 2008/0125001 A1 | 5/2008 | Barniak | |
| 2009/0243371 A1 | 10/2009 | Karlsson | |
| 2010/0251864 A1 | 10/2010 | Rose | |
| 2011/0203708 A1 | 8/2011 | Karlsson | |
| 2011/0233991 A1 | 9/2011 | Norman | |
| 2013/0337104 A1 | 12/2013 | Vannarsdall | |
| 2014/0132059 A1 | 5/2014 | Patrick | |
| 2014/0175350 A1 | 6/2014 | Mariotti | |
| 2015/0298501 A1 | 10/2015 | Engel | |
| 2019/0358995 A1 * | 11/2019 | Kurtz | B60B 3/08 |
| 2020/0298624 A1 * | 9/2020 | Zivkovic | B60C 11/032 |

FOREIGN PATENT DOCUMENTS

| | | | |
|---|---|---|---|
| JP | 58191603 | 11/1983 | |
| JP | 59124412 A * | 7/1984 | B60C 11/0306 |
| RU | 2438879 | 1/2012 | |
| WO | 2016048880 | 3/2016 | |

OTHER PUBLICATIONS

Wikipedia, "Shark Wheel," Last edited Jan. 2, 2018, https://en.wikipedia.org/wiki/Shark_Wheel.

Kickstarter Campaign, "Shark Wheel-the Square Skateboarding Wheel that Shat Shreds!," Published Jun. 2013, https://www.kickstarter.com/projects/1537100752/shark-wheel-the-square-skateboarding-wheel-that-sh/description.

* cited by examiner

SINUSOIDAL WHEEL

CROSS-REFERENCE TO RELATED APPLICATIONS

This application is a continuation of U.S. Non-Provisional application Ser. No. 16/679,058, filed Nov. 8, 2019, which is a continuation-in-part and claims the benefit of U.S. Non-Provisional application Ser. No. 16/181,920, filed Nov. 6, 2018, now U.S. Pat. No. 10,688,824, which is a continuation-in-part application and claims the benefit of U.S. Non-Provisional application Ser. No. 14/953,218, filed Nov. 27, 2015, now U.S. Pat. No. 10,118,439, which is a continuation-in-part and claims the benefit of U.S. Non-Provisional application Ser. No. 13/676,790, filed Nov. 14, 2012, which are hereby incorporated by reference, to the extent that they are not conflicting with the present application.

BACKGROUND OF INVENTION

1. Field of the Invention

The invention relates generally to various equipment such as material handling equipment (e.g., forklifts or pallet jacks), and more specifically to wheels used for such equipment.

2. Description of the Related Art

Material handling equipment is universal to the industrial industry, but the equipment itself encounters different issues navigating the warehouse floor because of the large amount of debris, uneven surfaces, and extreme temperatures. More specifically, as an example, the forklift truck has been around for a century, and today it is found in every warehouse operation around the world. Commercial and industrial goods of all kinds are moved in bulk for economic efficiency. Forklift trucks and hand operated jacks, usually referred to as "manual jacks," typically use forks, that is, at least a pair of horizontally protruding blades or tines as load bearing elements. The forks are mechanized in order to lift loads clear of ground surfaces so that the loads may be moved from place to place. The forks may be engaged with a pallet that has a variety of goods stored on top. In this manner the goods may be lifted, moved, and then lowered or raised to a new location. This procedure is very well known in the field of the invention.

"Forklift" is the common generic term used to refer to the various types of materials handling equipment that uses a fork for moving loads. Fork type equipment may be informally classified as follows:

class 1—electric motor rider trucks;
class 2—electric motor narrow aisle trucks;
class 3—electric motor or hydraulic hand operated jacks;
class 4—internal combustion engine trucks—cushion tires;
class 5—internal combustion engine trucks—pneumatic tires;
class 6—electric and internal combustion engine tractors; and
class 7—rough terrain forklift trucks.

All of the foregoing classes of fork type equipment have in common is that they are types of forklift jacks, or simply "forklifts" or "materials handling" equipment. Jacking mechanisms typically are motorized or hydraulically operated. A forklift may be a powered industrial truck; that is, a forklift truck, used to lift and move materials horizontally and vertically. A forklift may also be a manual jack; typically, a hydraulic lifter, which may be operated, propelled, and steered manually. Both the forklift truck and manual jack are designed for handling heavy loads which may or may not be palletized and for moving such loads over relatively short distances. Of course, there are exceptions and hybrid types of forklifts. Collectively these will be termed "forklifts" or "materials handling equipment" herein throughout.

The fork element of such materials handling equipment has load bearing wheels which may be retracted into its blades so that the blades may be dropped to a floor surface. The wheels may be extended into contact with the floor surface as the blades are lifted. Therefore, the extended wheels are relied upon to help support loads placed on the fork as a load is moved and maneuvered. Because the blades must be able to fit into a pallet with clearance, they must be relatively thin and flat, dimensions that necessitate associated blade wheels have a relatively small diameter in order to fit inside the blades. This has several drawbacks, including the fact that small diameter wheels have difficulty in traversing rough or cracked floor surfaces and doorway thresholds, and having small circumferences such wheels tend to wear out quickly. The material handling equipment also has a drive or steering wheel, which similarly travels over the uneven and rough surfaces of the warehouse. The material handling equipment, such as a forklift, uses the drive wheel to navigate the warehouse grounds and leads the equipment in the desired direction. However, the drive wheel is also susceptible to the uneven and cracked ground which may make the material handling equipment veer off the desired path of transporting the materials.

The blade wheels support much of the weight of a load during forklift operations. Blade wheels may be axially elongated so as to reduce instantaneous stress on floor surfaces. Typical blade wheels have a limited life as they wear, crack, spall, and develop flats meaning they must be replaced frequently. Therefore, there is a need for materials handling equipment load and drive wheels that will minimize damage to floor surfaces, have a longer operating life than wheels in current use, and are able to more easily traverse uneven floor surfaces and thresholds.

Blade wheels operate in many different types of conditions depending on the warehouse or environment they are used in. A common problem for blade wheels is excessive heat from overuse and the ambient temperature of the warehouse causing wheel failure due to this heat. Blade wheels also lack longevity because they have one defined center point that totals 360 degrees around the wheel, which means the circumference is continuously wearing away. The lack of longevity is also caused by scrubbing when the blade wheels change direction. The one defined center point that totals 360 degrees also lacks in its ability to absorb shock, making the material handling equipment less stable when moving fragile objects.

Typically, small objects (i.e., small nuts, bolts, woodchips and common warehouse floor obstacles) embed into the blade wheels, which also leads to wheel failures. The small objects are rolled over by or embedded in the wheels causing the floor obstacles to hinder the performance of a traditional wheel. Another issue is caused by the typical wheel being one elongated wheel causing this wheel to 'scrub' when changing directions. This is due to the interior portion of the wheel needing to travel a lesser distance than the exterior portion of the wheel. However, since the wheel is one unit the interior portion of the wheel scrubs, or drags, causing for more wear on the wheels. The singular elongated wheel produces a scrub radius that will cause the wheels to unevenly wear over time.

Therefore, there is a need to solve the problems described above by proving a wheel with a longer life over the current material handling wheel along with a wheel with better maneuverability.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a sinusoidal wheel that dissipates heat because the shape of the wheel's channels allows the heat created by load and friction to escape more efficiently by providing air flow through the sinusoidal channels. The modular nature of the wheel allows each wheel to roll independently of each other, which also allows for less friction meaning less temperature increases. In scientific $3^{rd}$ party drum testing and real-world testing on material handling equipment with these sinusoidal wheels, the heat is dissipated through the shape of the wheel better than traditional wheels used in these scenarios. Thus, an advantage is minimum failing of the wheel due to heat.

In another aspect, a sinusoidal wheel that physically pushes small nuts, bolts, woodchips and common warehouse floor obstacles left and right out of the way. University testing on the sinusoidal wheel shows better off-road ability due to the 'approach angle' of the wheel always striking objects at an angle instead of steamrolling over the objects. The sinusoidal channels also utilize the unique approach angle to strike objects at an angle, which thereby also reduces shock. The sinusoidal channel of the wheel allows less of a contact patch where objects can interact with the wheel. Thus, an advantage is minimum failing of the wheel due to small debris and surface obstacles. Another advantage is the sinusoidal channel of the wheel allowing for less of a contact patch where objects may interact with the wheel.

In another aspect, a sinusoidal wheel that has a circular cross section with a sinusoidal wave alternating side to side across the exterior of the circular cross section, the sinusoidal wave defining a sinusoidal peripheral surface. The sinusoidal peripheral surface of the sinusoidal wheel is greater than the peripheral surface around a traditional wheel. The sinusoidal peripheral surface is at a constant radial distance from its axis of rotation, meaning the center point of the sinusoidal wheel oscillates with respect to the sinusoidal peripheral surface. Traditional wheels have one defined center point that totals 360 degrees around the wheel, which leads to unbalanced wear and tear because the traditional wheel will usually favor a side to wear down. The oscillating center point makes the wear and tear more balanced and therefore more evenly distributed over the sinusoidal peripheral surface. Thus, an advantage of the sinusoidal wheel is its longevity due to the oscillating center point allowing for more evenly distributed wear and tear.

In another aspect, the modular nature of the sinusoidal wheel allows each wheel to roll independently of each other, so the wheels do not 'scrub' when changing directions. Thus, an advantage of the sinusoidal wheel is the longevity when wear is a concern. The presently described and illustrated sinusoidal wheel has been shown through extensive testing to have significant advantages over forklift and materials handling equipment load and drive wheels in current use.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
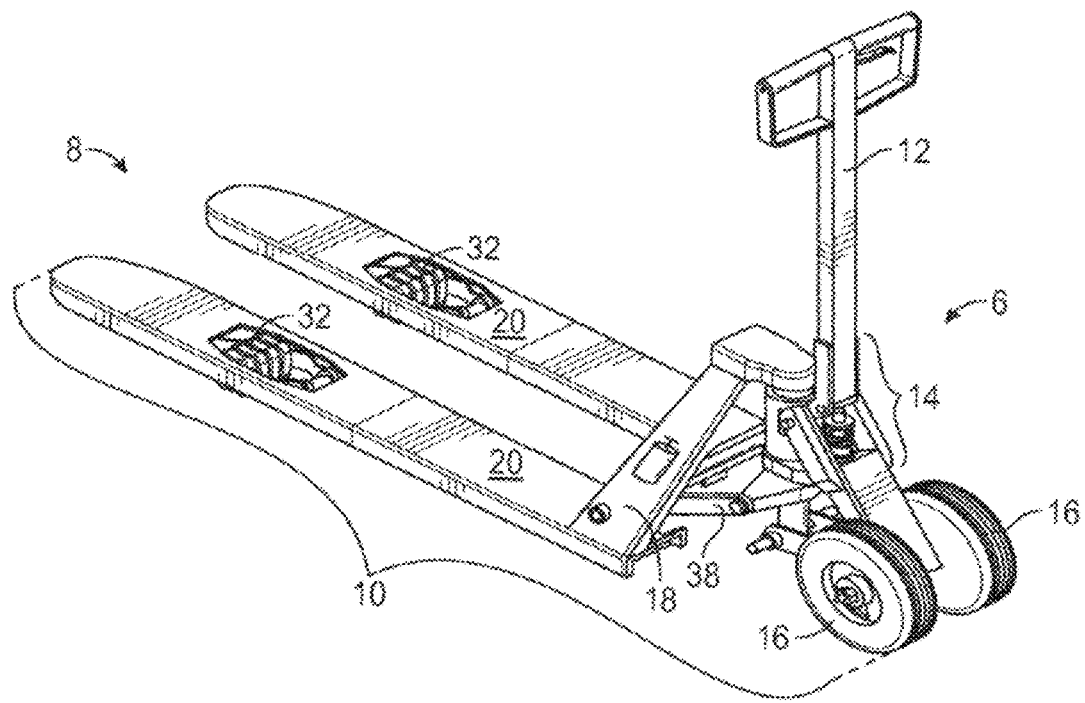
FIG. 1 illustrates the perspective view of a forklift with an integral blade wheel assembly retracted, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

Figure 2:
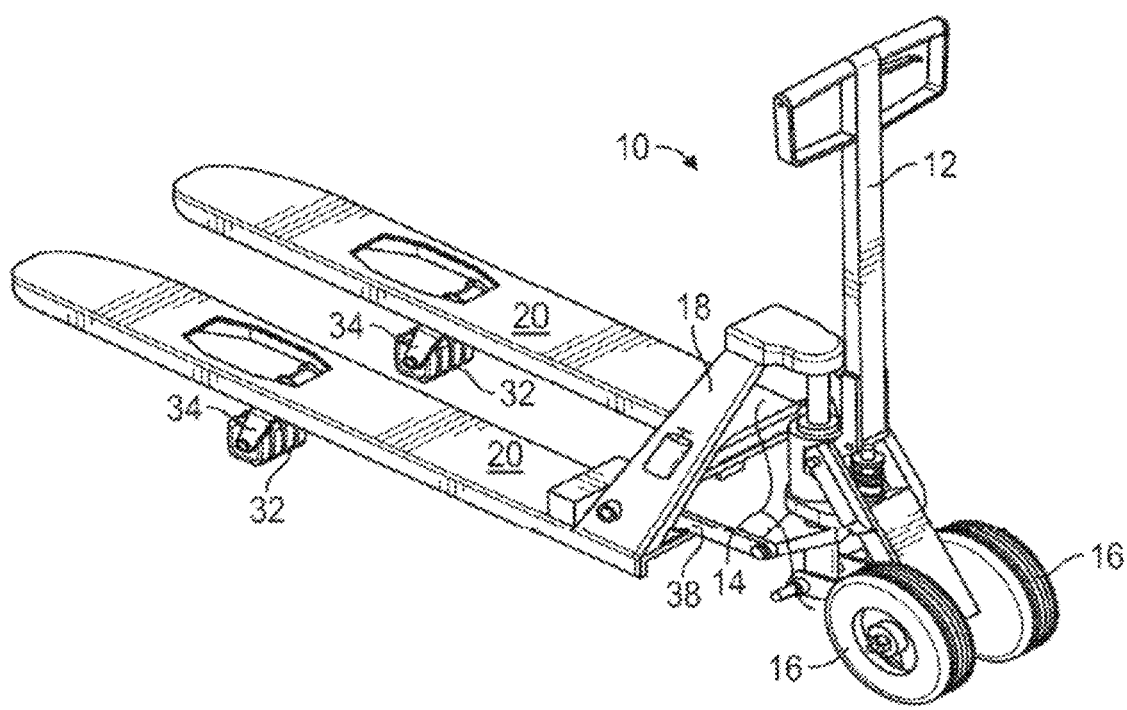
FIG. 2 illustrates the perspective view of a forklift with an integral blade wheel assembly in a raised attitude, according to an aspect.

FIG. 1 illustrates the perspective view of a forklift with an integral blade wheel assembly 32 retracted, according to an aspect. In this description, materials handling by various equipment devices such as manual jack, forklifts, or pallet jacks are referred to as an example of equipment in which the disclosed wheels and wheel sets may be used. An exemplary forklift, or manual jack 10 is shown in FIG. 1 and FIG. 2, which is used as only an example to illustrate the features and operations of a forklift and materials handling equipment in general and it should be recognized that such features and operations are common to most forklifts and materials handling equipment. It should be realized that the forklift and materials handling equipment, including the manual jack 10, may be used to move loads stored on a pallet or, alternatively, in the absence of a pallet. The manual jack 10 has a proximal end 6 and a distal end 8. The manual jack 10, as shown, is well-known in the art. A forklift truck (not shown), is also very well known in the art and both the manual jack 10 and a forklift truck may be referred to as "load movers" and "materials handling equipment" as they represent a class of conveyance machines that are related in their construction, operation, and duty. In this description, the illustrated apparatus is referred to as the manual jack 10. However, the following description applies to both the manual jack type as well as the forklift truck type and other related conveyance and materials handling equipment.

Figure 3:
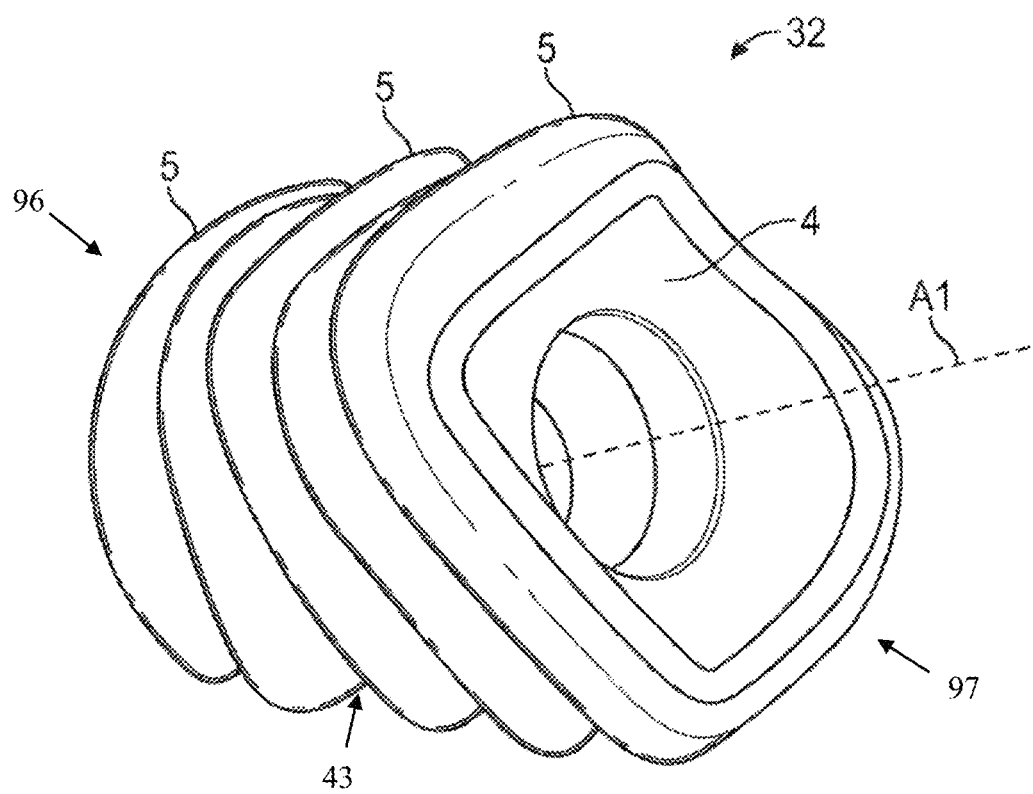
FIG. 3 illustrates the perspective view of an integral blade wheel assembly, according to an aspect.
Figure 4:
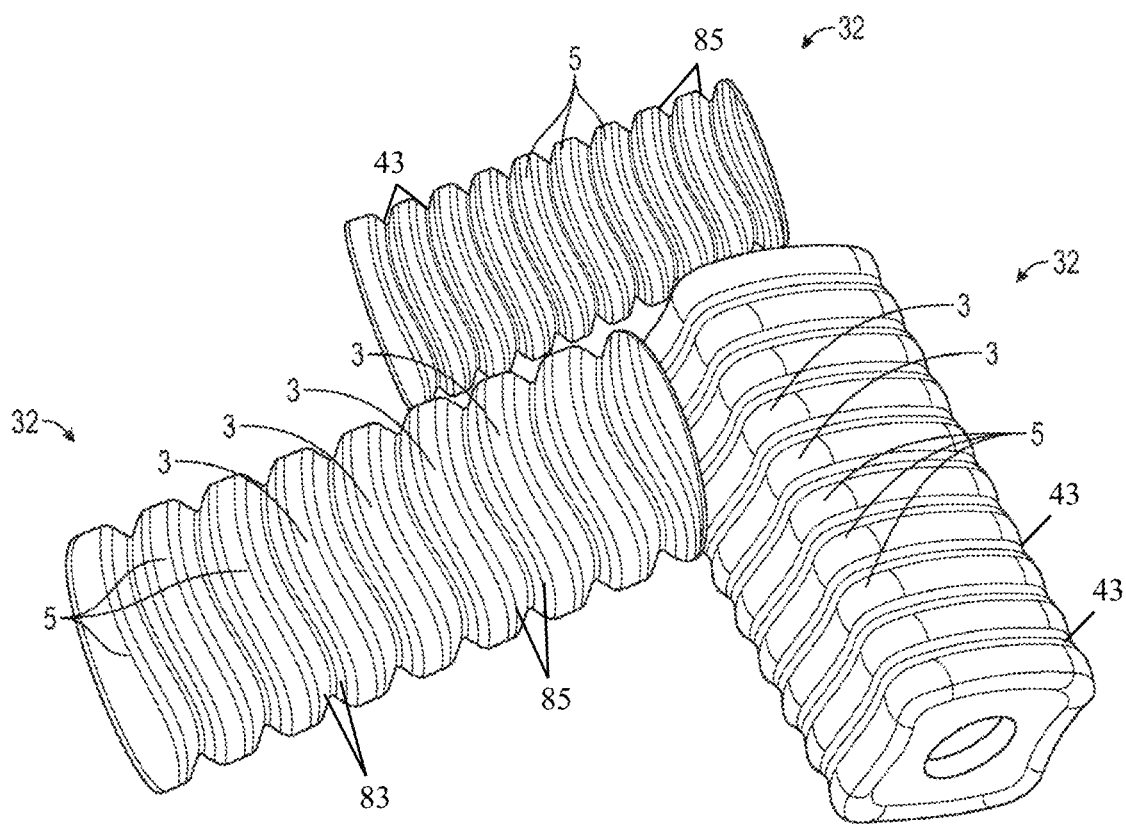
FIG. 4 illustrates the perspective view of three integral wheel assemblies, according to an aspect.

The manual jack 10 may be manually moved and steered in its operation. FIG. 1 shows that manual jack 10 may have a lifting apparatus 14, such as a hydraulic cylinder, and linkages positioned at proximal end 6. The lifting apparatus 14 may be mechanically engaged with fork 18 which may have two elongated and spaced-apart blades 20 extending between the proximal end 6 and a distal end 8. As shown, integral blade wheel assembly 32 may be engaged with each blade 20, wherein each integral blade wheel assembly 32 may have multiple individual sinusoidal protrusions 5 (more clearly shown in FIG. 7a) attached to a common axial core 4 and may be axially aligned on a rotational axis A1, as shown in FIG. 3 and as it will be described in reference to FIG. 3. Each of the individual sinusoidal protrusions 5 may have a sinusoidally shaped peripheral surface 3 as best seen in FIG. 4.

The integral blade wheel assembly 32 may be placed towards the distal end 8, which means the integral blade wheel assembly 32 are load bearing wheels. Due to the wheels being load bearing, the maneuverability of said wheels is more important. Without the maneuverability the sinusoidal wheel provides the current palette wheel would be inefficient at its job to move heavy items around, as will be described in FIG. 8. The integral blade wheel assembly 32 and the sinusoidal wheel may also be used as the driver or steering wheel 16. The integral blade wheel assembly 32 and the sinusoidal wheel would have the same benefits as disclosed herein also when used as the steering or drive wheel of the various materials handling equipment devices. For example, when acting as a driving wheel 16, the sinusoidal wheel 32 would maneuver better over uneven terrain and resist failures due to heat.

FIG. 2 illustrates the perspective view of a forklift 10 with an integral blade wheel assembly 32 in a raised attitude, according to an aspect. The integral blade wheel assembly 32 may be linked with the lifting apparatus 14 by a linkage 38 such when fork 18 is lowered integral blade wheel assembly 32 are retracted, as shown in FIG. 1, and when the fork 18 is raised, the integral blade wheel assembly 32 are extended, as shown in FIG. 2, which well known in the field.

As shown in both FIG. 1 and FIG. 2, a lifting apparatus 14 based upon a hydraulic cylinder is mounted on board the forklift 10. A pivotal handle 12 may be used to generate hydraulic pressure by pivoting it in a vertical motion. The pivotal handle 12 may also be used to push or pull and to steer the forklift 10 in a rolling action across a factory floor or other industrial surface. Below the handle 12 are typically two steering wheels 16 that may be rotated from one side to the other by the handle 12 for steering. The steering wheels 16 support the weight of the lifting apparatus 14, handle 12, a portion of the load on blades 20, and a pallet and its load (not illustrated).

The integral blade wheel assembly 32 may have a circular exterior surface 84, which will be discussed in reference to FIG. 7c, and each integral blade wheel assembly 32 may have one or more integral individual sinusoidal protrusion 5. The individual sinusoidal protrusions 5 may be aligned in a linear order and associated with a common central core 4 which is aligned about axis A1, as shown in FIG. 3 and as it will be described with reference to FIG. 3. The individual sinusoidal protrusions 5 may also be integral to the common central core 4 to create the integral blade wheel assembly 32, which would be a single integral unit. Each individual sinusoidal protrusion 5 may have a peripheral surface 3 that has a circular profile but wavers from side to side sinusoidally as the integral blade wheel assembly 32 rotates. The sinusoidal wheel has a circular cross section with a sinusoidal wave alternating side to side across the circular cross section, the sinusoidal wave defining the sinusoidal peripheral surface 3. This individual sinusoidal protrusion 5 construction is clearly shown in FIG. 4 and as it will be described with reference to FIG. 4. The sinusoidally varying peripheral surface 3 may be the surface of the wheel which comes into contact with the ground when the wheel is mounted.

FIG. 3 illustrates the perspective view of an integral blade wheel assembly 32, according to an aspect. Between the sinusoidal peripheral surfaces 3 are the sinusoidal channels 43 which are more clearly shown in FIG. 4 and which will be described with reference to FIG. 4. The integral blade wheel assembly 32 may be monolithic, meaning it may be integrally formed as one unit and used as such. The entire integral blade wheel assembly 32, from the left end 96 to the right end 97, may be formed by a single mold, with or without the common axial core 4. A material may be poured into the single mold for the integral blade wheel assembly 32, and then after curing the formed integral blade wheel assembly 32 may be removed from the single mold in its monolithic form. In an example, the multiple individual sinusoidal protrusions 5 may be integral to a common axial core 4 and may be axially aligned on a rotational axis A1.

In another example, the individual sinusoidal protrusions 5 may be mounted to the common axial core 4. The common core, or common axial core 4 may run the length of the integral blade wheel assembly 32 allowing for the wheel assembly to be applied to multiple systems. The rotational axis A1, which is the centerline of the common axial core 4, may allow for the integral blade wheel assembly 32 to be easily applied to existing manual jack 10 axles. The rotational axis A1 may also allow for the scrub radius to be the necessary distance to reduce wear on the wheels.

The individual sinusoidal protrusions 5 may be on a circular exterior surface 84, which will be discussed in reference to FIG. 7c. The individual sinusoidal protrusions 5 may also utilize a unique approach angle to strike objects at an angle, thereby reducing shock. The integral blade wheel assembly 32 does not approach obstacles at a ninety-degree angle like other wheels. The integral blade wheel assembly 32 approaches obstacles from an angle, which may allow for less shock when traveling over the uneven surfaces. For example, the integral blade wheel assembly 32 may approach the obstacle at a thirty-degree angle.

In an example, the integral blade wheel assembly 32 may be molded of a hard polyurethane. The hard polyurethane may more specifically be a type that may not scuff or leave a mark on most surfaces. The integral blade wheel assembly 32 with the sinusoidal individual sinusoidal protrusions 5 may be long wearing and may not break down due to heavy loading as conventional pallet wheels typically do. This may be due to the individual sinusoidal protrusions 5 tending to strain in the axial direction and being of a material that may not show cyclic strain hysteresis. The sinusoidal shape of the individual sinusoidal protrusions 5 may have the advantage of gripping a surface with a coefficient of friction nearly equal to that of a conventional individual sinusoidal protrusion having a width dimension equal to the peak-to-peak dimension of individual sinusoidal protrusion 5. Another advantage of the individual sinusoidal protrusion 5 may be an approximate 30% weight reduction, which may provide savings in material cost. An important advantage of sinusoidal wheel 32 is that when an object such as a piece of gravel or a small stone is encountered by the wheel 32 it tends to be pushed or rolled into a space between adjacent individual sinusoidal protrusions 5 and therefore has less of an effect on individual sinusoidal protrusion surface damage.

In another example, a tire with the sinusoidal channels 43 and protrusions 5 attached to a rim or hub may be used. This may allow for the integral blade wheel assembly 32 to be easily manufactured and applied to many material handling equipment.

FIG. 4 illustrates the perspective view of three integral wheel assemblies 32, according to an aspect. FIG. 4 further shows the sinusoidal peripheral surfaces 3 of each individual sinusoidal protrusion 5. The sinusoidal peripheral surface 3 has an exterior curvature that forms to the exterior of the individual sinusoidal protrusions 5. The sinusoidal peripheral surface 3 may be adjacent to the sinusoidal channel 43 and the peripheral surface 3 may have a sinusoidal edge 85 facing the sinusoidal channel 43.

Individual sinusoidal protrusions 5 may be coupled together as a plurality of individual sinusoidal protrusions 5 on the common axial core 4 to create the integral wheel assembly 32. As shown, the individual sinusoidal protrusions 5 disposed adjacent to one another create grooves in the space between each two adjacent protrusions. These grooves, which include protrusion sides 83, are sinusoidal channels 43. The sinusoidal channel 43 may allow for small objects (i.e., small nuts, bolts, woodchips and common warehouse floor obstacles) to be pushed the left and right out of the way of the palette jack's path. The sinusoidal channel 43 would also allow for heat to dissipate because of the air flow through the sinusoidal channels 43. The sinusoidal channels 43 would then allow for less wear because of the heat dissipation and the constant air flow. The approach of the wheel may never be a ninety-degree angle because of the sinusoidal channels 43. The sinusoidal channel 43 may be narrower at the bottom of the channel and wider at the top of the channel, which may allow for the corresponding sinusoidal protrusion 5 to have a wider base to help with bearing the loads of the material handling equipment. The integral blade wheel assembly 32 may be broken into two or more wheel set assemblies to allow for the benefits of such as it will be described in FIG. 8-FIG. 12.

Figure 5:
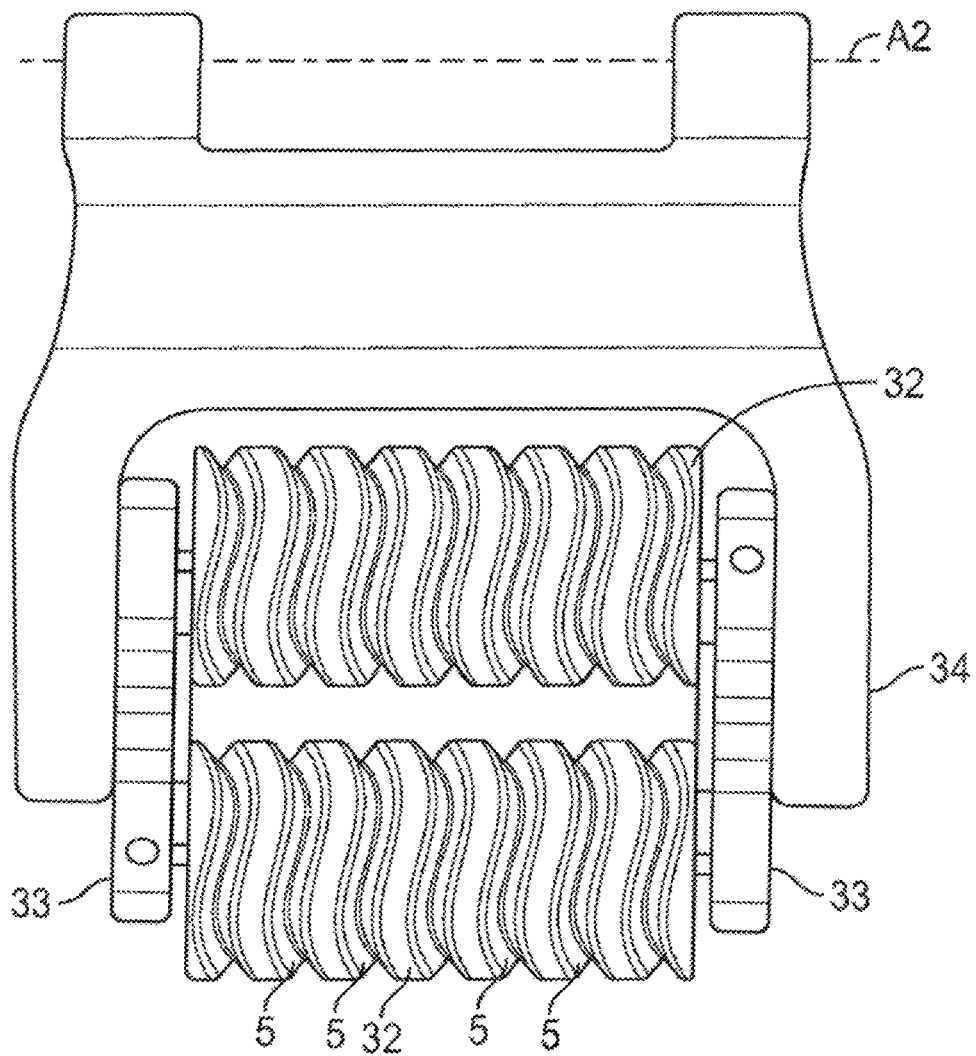
FIG. 5 illustrates a plan view of a tandem integral wheel assembly, according to an aspect.

FIG. 5 illustrates a plan view of a tandem integral wheel assembly, according to an aspect. As shown in FIG. 5, a possible mounting arrangement of the integral blade wheel assembly 32 may be used, wherein tandem integral blade wheel assembly 32 are mounted on a pivotal carrier 33 which, in turn, is pivotally mounted on a rotating arm 34 which allows the tandem integral blade wheel assembly 32 to move between the retracted position and the extended position. The advantage of the use of tandem wheels may be that a load is distributed to four integral blade wheel assembly 32 rather than only two, so that the applied stress on the integral blade wheel assembly 32 is reduced. As described herein, the blade wheel 32 is load bearing, which having the tantum assembly may reduce the load on any one given wheel.

Figure 6:
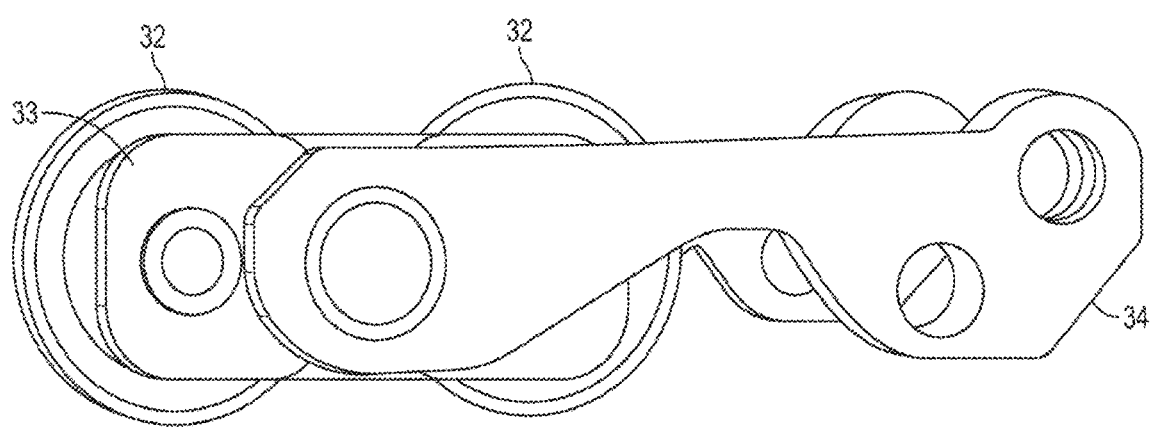
FIG. 6 illustrates a side perspective view of the tandem integral wheel assembly in a manual jack mounting device, according to an aspect.

FIG. 6 illustrates a side perspective view of the tandem integral wheel assembly in a manual jack mounting device, according to an aspect. As shown in FIG. 6, the duel blade-wheels 32 may be mounted rotationally in tandem and may be attached to bogle plates 33. In another example, the bogle plates 33 are rotationally mounted on the swing arm 34. The advantage of the use of tandem wheels may be that a load is distributed to four integral blade wheel assembly 32 rather than only two, so that the applied stress on the integral blade wheel assembly 32 is reduced.

Figure 7A:
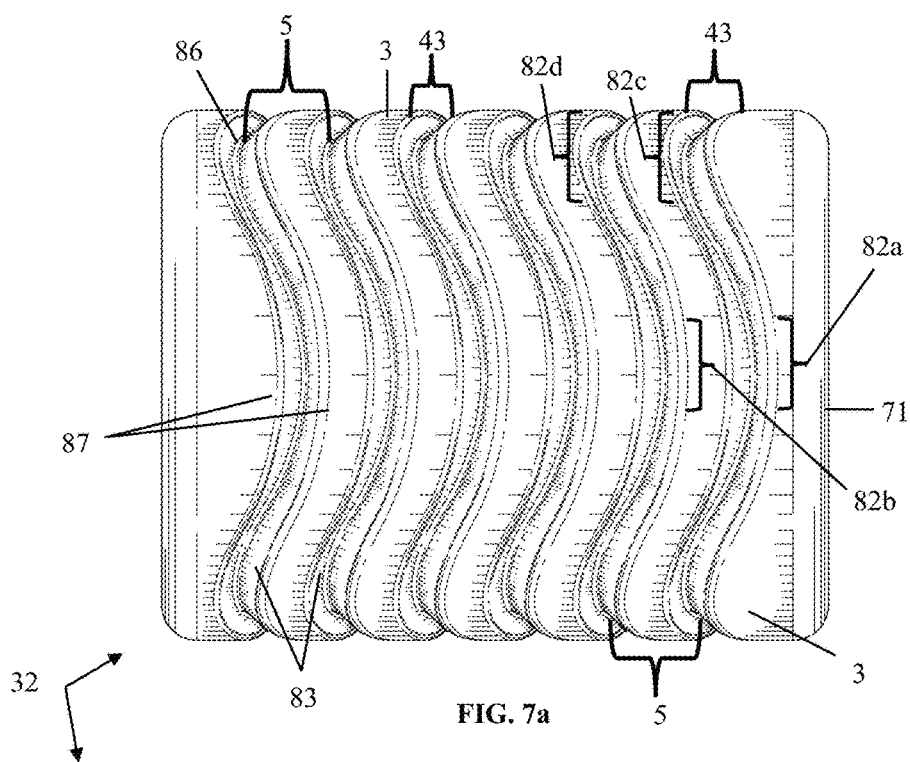
FIG. 7a—FIG. 7c illustrate side perspective and plan views of the integral blade wheel assembly, according to an aspect.
Figure 7B:
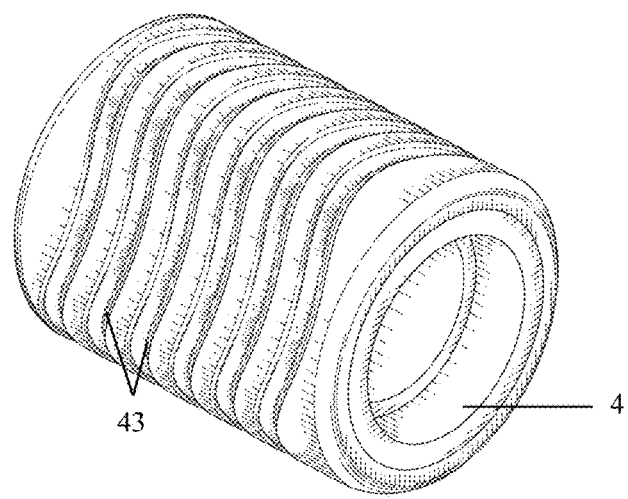
Figure 7C:
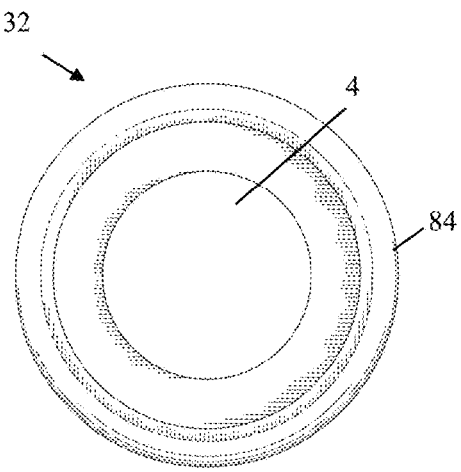

FIG. 7a-FIG. 7c illustrate side perspective and plan views of the integral blade wheel assembly 32, according to an aspect. FIG. 7a is side perspective view of the integral blade wheel assembly 32. As shown, the integral blade wheel assembly 32 has individual sinusoidal protrusions 5, sinusoidal peripheral surfaces 3, and a sinusoidal channel 43. Each sinusoidal channel 43 has a sine wave with peaks 82a and valleys 82c, with one peak 82a and one valley 82c being a complete period of the sine wave. Also, as shown in FIG. 7a the sinusoidal channels 43 are in parallel, with each peak 82a and 82b and each valley 82c and 82d of the sinusoidal channel 43 being in alignment with the adjacent sinusoidal channel peak and sinusoidal channel valley. For example, the peak 82a is in parallel and aligned with the peak 82b and each valley 82c and 82d are in parallel. While in the drawings the sinusoidal channels are showed to be aligned with each peak in parallel with each other, the sinusoidal channels may have alternating sinusoidal channels with each peak of each sinusoidal channel being in opposition with the adjacent sinusoidal channel.

The sinusoidal peripheral surface 3 would have a peripheral surface greater than a peripheral surface of a traditional wheel. The sinusoidal pattern of the sinusoidal peripheral surface 3 allows for the larger peripheral surface without increasing the diameter of the wheel because there is a distance longer than the circumference of the circular exterior surface. Having a greater peripheral surface means the wheel will not wear out as quickly as a traditional wheel.

The sinusoidal peripheral surface 3 is at a constant radial distance from the axis of rotation A1. This means the actual center point of the sinusoidal wheel oscillates with respect to the sinusoidal peripheral surface 3, along the axis of rotation A1. In a traditional wheel, the wheel will have a single center point which leads to unbalanced wear due to the traditional wheel favoring one side or the other during use. This causes the traditional wheel to wear down unevenly making the wheel unusable, which would require frequent replacing of the wheel. The oscillating center point of the sinusoidal wheel makes the wear and tear more balanced because the wear and tear is more evenly distributed over the sinusoidal peripheral surface 3. Thus, the oscillating center point allows the sinusoidal wheel to last longer.

In an example, the sinusoidal peripheral surface 3 may have 540 degrees of peripheral surface 3 that is defined from its oscillating center point. Exceeding the 360 degrees of peripheral surface of a traditional wheel is done by using the sinusoidal peripheral surface 3, in which a complete sine wave period (one peak 82a and one valley 82c) is 360 degrees and every additional peak or valley corresponds to 180 degrees. For example, having a sine wave with two peaks and one valley would equal 540 degrees of a peripheral surface 3. In another example, the sinusoidal peripheral surface 3 may have more or less than 540 degrees around the oscillating center point depending on for example how many half periods (peak or valley) are included in the sinusoidal peripheral surface 3.

Also shown in FIG. 7a is that each sinusoidal channel 43 is spaced at an equal distance apart. This may be a preferred configuration; however, the sinusoidal channels may be spaced in different distance configurations. More specifically, other geometric sequences may be used for the spacing of the sinusoidal channels 43.

The sinusoidal channels 43 allow small objects (i.e. woodchips, nails, nuts, bolts, etc.) to be either pushed left and right, out of the way, or funneled through the groove and exit out the back of the wheel. The sinusoidal channels 43 also allow heat dissipation because the sinusoidal channels 43 are conducive for air flow, which may allow the wheel set assembly to cooler and this may produce less wear and tear on the wheel set assembly. The sinusoidal peripheral surfaces 3 may allow for a unique approach angle to strike objects at an angle, thereby reducing shock.

As shown in FIG. 7a, the sinusoidal protrusions 5 are not perpendicular to the sinusoidal peripheral surface 3. The protrusion sides 83 angle outward when near the base of the protrusion to provide more material, which may help with bearing the load. The curvature of the protrusion sides 83 provides a larger base for the sinusoidal protrusions 5, which bears the load of the material handling equipment. The larger base may allow for the sinusoidal protrusions 5 to handle a large load while still claiming the benefits of the sinusoidal channel 43 as mentioned.

It should be noted that there is a particular configuration of the sinusoidal protrusion 5 such that the protrusions are narrower at the top, being the circular exterior surface, and wider at the sinusoidal bottom 86, being the inner most part of the sinusoidal channel 43, and vice versa the sinusoidal channels 43 are narrower at the sinusoidal bottom 86 and wider at the top. This configuration is important for the structural integrity of the wheel, so it is capable of withstanding more load than when the protrusion is perpendicular to the ground. This also allows for the functionality mentioned herein. In an example, the sinusoidal channel 43 may be v-shaped like with the corresponding and adjacent the sinusoidal protrusion 5 having a trapezoidal like shape. The sinusoidal protrusion 5 shape having a wider bottom with a narrower top allows for an increased sturdiness of the sinusoidal protrusions 5 as shown in FIG. 14a-FIG. 14d, and as it will be described when referring to FIG. 14a-FIG. 14d. This allows for larger load capabilities along with more durability of the individual sinusoidal protrusion 5.

FIG. 7b is a perspective view of the integral blade wheel assembly 32 and shows the common central core, or axial core 4. The axial core 4 may allow the integral blade wheel assembly 32 to be applied to any manual jack 10. FIG. 7c is a side view of the integral blade wheel assembly 32 and also shows the axial core 4. Both FIG. 7b and FIG. 7c show the integral blade wheel wall 71 which may be a flat surface to avoid friction and interference from the manual jack while in motion. The sinusoidal wheel 32 may have individual sinusoidal protrusions 5 and corresponding sinusoidal channel 43.

Shown in FIG. 7c is a circular exterior surface 84. The circular exterior surface 84 may be the portion of the wheel that may come into contact with the ground and the loose debris found in industrial settings. In an example, the circular exterior surface 84 would be comprised of both the sinusoidal peripheral surface(s) 3 and the sinusoidal channel (s) 43 in a way such that to make the circular exterior surface 84 a single continuous exterior wheel surface. The outer most of the parts of the exterior surface 84, namely the peripheral surfaces 3, would have a collective circular profile shape to allow the wheel to roll properly as a wheel is intended to. The circular exterior surface 84 would be the sinusoidal peripheral surfaces 3 along with the sinusoidal channels 43, while only the sinusoidal peripheral surfaces 3 are what come in contact with the ground when the integral blade wheel assembly 32 is rolling. The shape of the wheel may be circular to ensure the wheel rolls properly. The sinusoidal channels 43 may allow for the debris to not interfere with the rolling of the wheel, while the circular exterior surface 84 ensures the sinusoidal wheel rolls smoothly over the ground or a flat surface like a typical wheel does.

Figure 8:
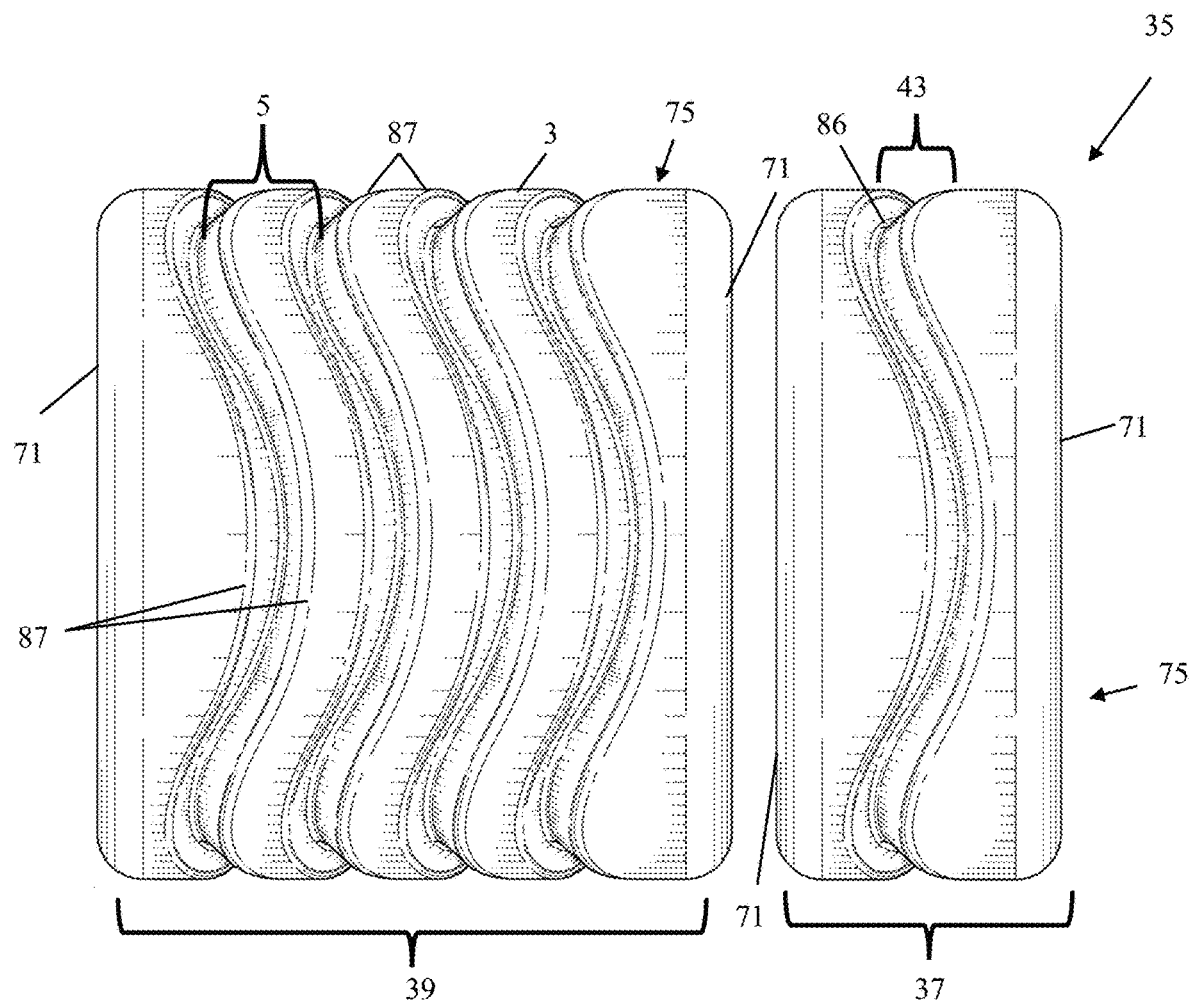
FIG. 8-FIG. 10 illustrate plan side views of two-set wheel assemblies, according to an aspect.
Figure 9:
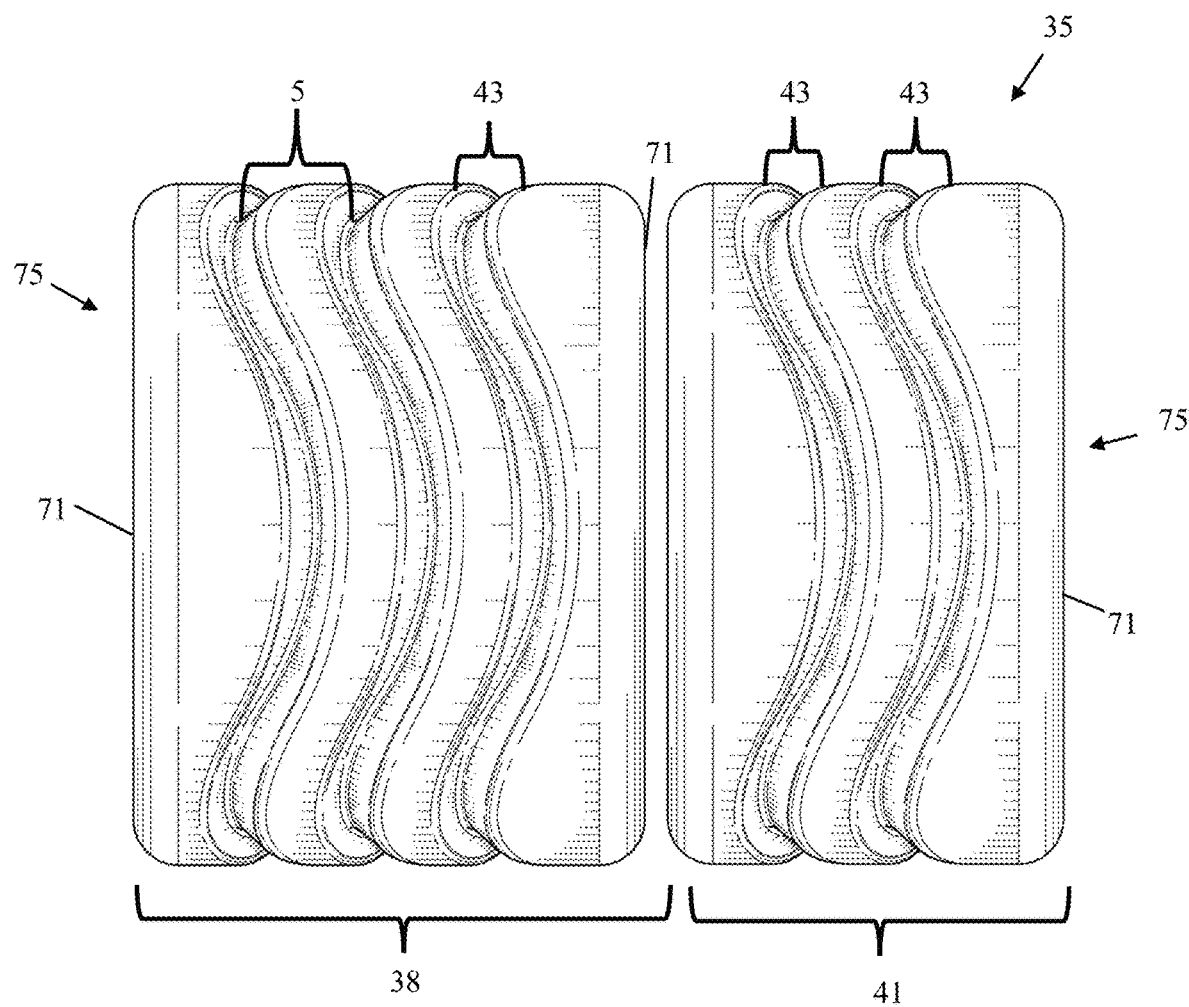
Figure 10:
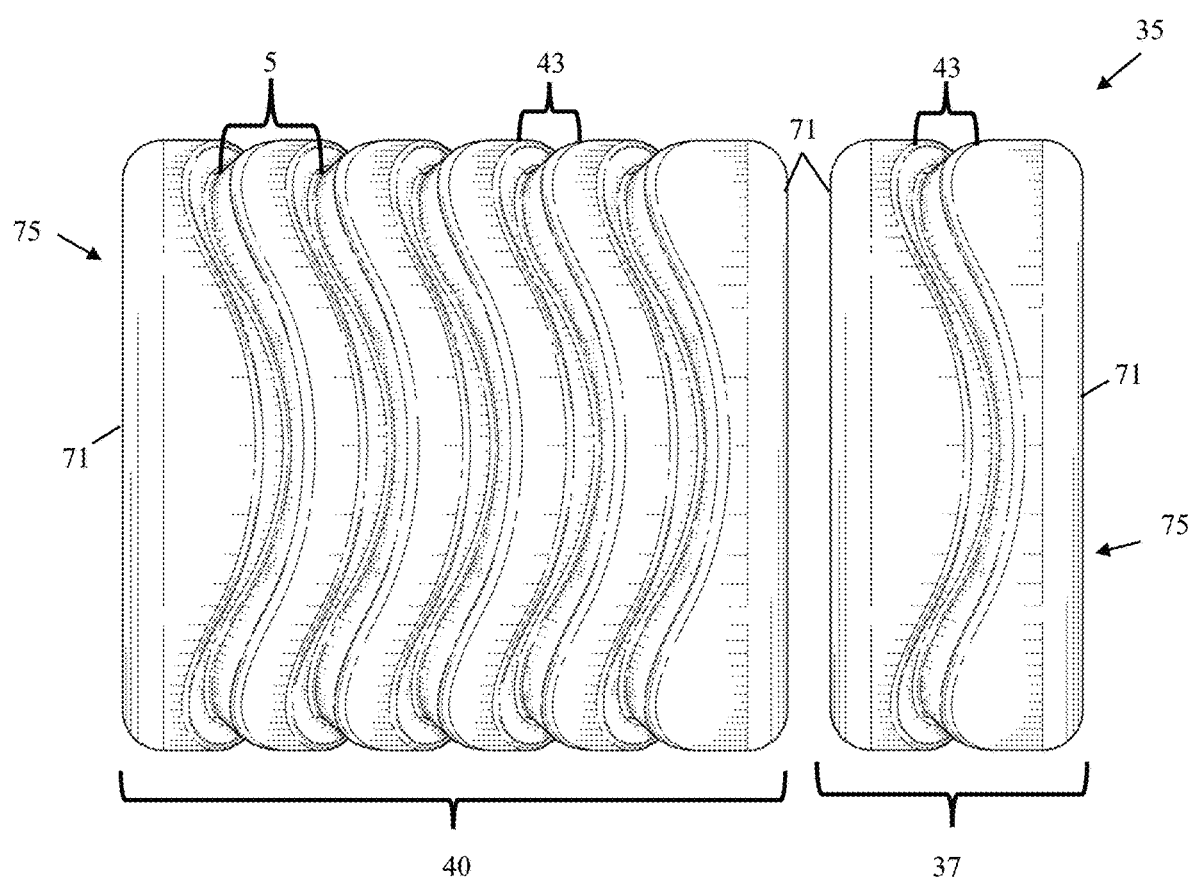

FIG. 8-FIG. 10 illustrate plan side views of two-set wheel assemblies 35, according to an aspect. The integral blade wheel assembly 32 may be broken into multiple sinusoidal channeled wheels 75, which may have multiple sinusoidal protrusions 5 with corresponding sinusoidal channels 43. The integral blade wheel assembly 32 may be broken into a two-set wheel assembly 35 comprised of two sinusoidal channeled wheels 75. Each wheel assembly set may have an individual sinusoidal protrusion 5 and corresponding sinusoidal channel 43. Shown in FIG. 8 is a two-set wheel assembly 35 with a single sinusoidal channeled wheel 37 and quad-sinusoidal channeled wheel 39. As shown in FIG. 8, the single sinusoidal channeled wheel may have a sinusoidal bottom 86 and a sinusoidal surface edge or sinusoidal edge 87. The sinusoidal bottom 86 and the sinusoidal surface edge are the components to the sinusoidal channel 43. In an example, the sinusoidal edges 87 may be in line with the sinusoidal peripheral surface 3, which may be the surface that is in contact with the ground. The sinusoidal bottom 86 of the sinusoidal channel 43 may be the base for the shape of the sinusoidal channel allowing for the protrusion sides 83 to be the desired curvature when connecting to the sinusoidal edges 87.

FIG. 9 is a two-set wheel assembly 35 with a double sinusoidal channeled wheel 41 and tri-sinusoidal channeled wheel 38. FIG. 10 is a two-set wheel assembly 35 with a single sinusoidal channeled wheel 37 and five sinusoidal channeled wheel 40. The wheel distance shown in FIG. 8-FIG. 10 may not be the actual distance, but a preferred way to mount the wheel set may be close as possible without interference from the adjacent wheels. The wheel sets allow each of the channeled wheels 75 to spin independently at different rates when needed.

The wheel sets may move independently of each other, which may lower the friction coefficient and give greater maneuverability to the wheel. The reduction in scrubbing due to the modular wheel set when turning equates to less wear because the wheel may rotate independently.

Figure 11:
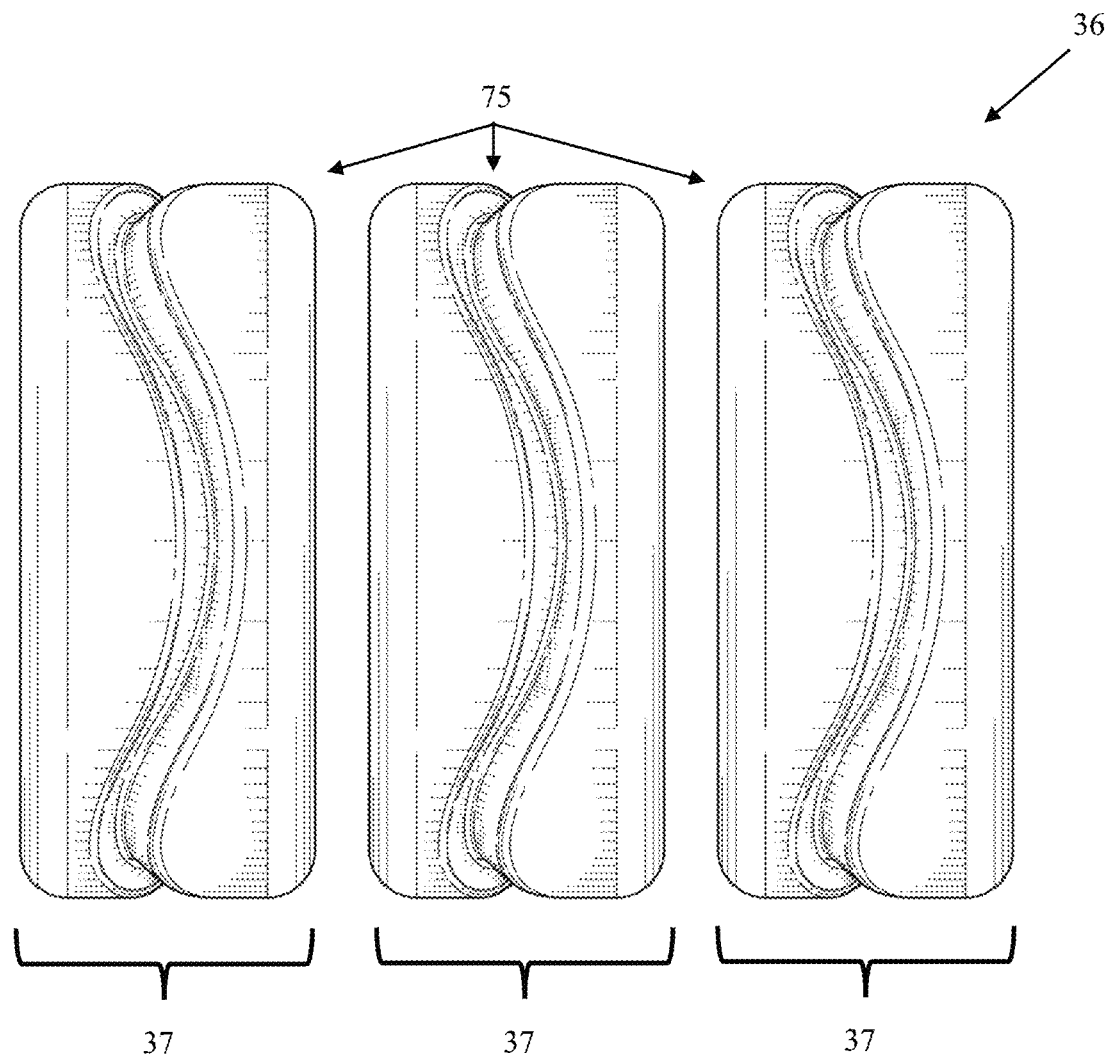
FIG. 11-FIG. 12 illustrate plan side views of three-set wheel assemblies, according to an aspect.
Figure 12:
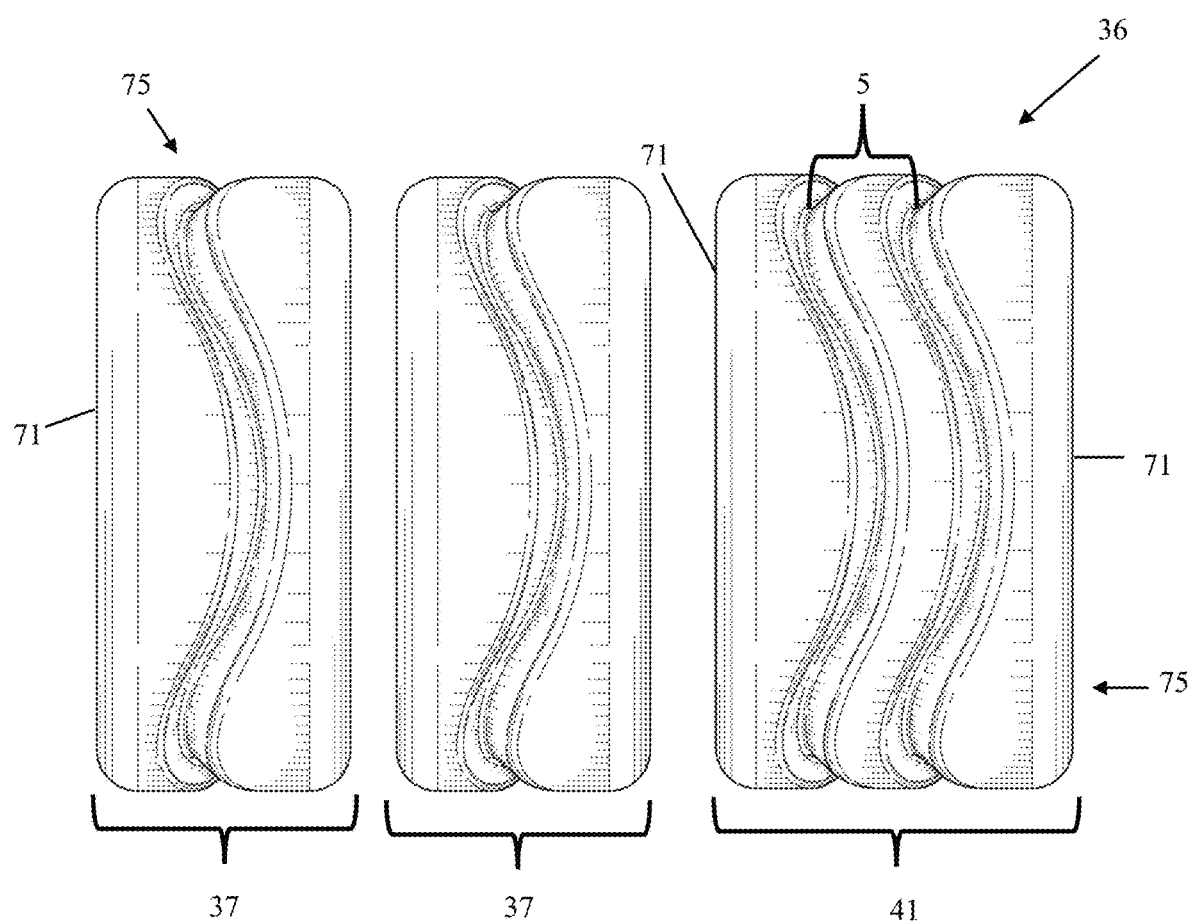

FIG. 11-FIG. 12 illustrate plan side views of three-set wheel assemblies, according to an aspect. The integral blade wheel assembly 32 may be broken into a three-set wheel assembly 36 comprised of three sinusoidal channeled wheels 75. Shown in FIG. 11 is a three-set wheel assembly 36 with single sinusoidal channeled wheels 37. FIG. 12 is a three-set wheel assembly 36 with two single sinusoidal channeled wheels 37 and a double sinusoidal channeled wheel 41. Again, the three-set wheel assembly 36 would have the advantages of rolling independently and providing more maneuverability. The three-set wheel assembly 36 may also have a flat wheel wall as shown. The wheel wall 71 may allow for less friction between the wheel set assemblies, which would thus provide longevity to the wheels because they would not wear down as much due to the friction between each set. The wheel walls 71 may be flat longitudinal ends, which may allow for a decrease in friction when the wheels are rotating independently. The distance shown in FIG. 11-FIG. 12 may not be the actual distance, but a preferred way to mount the wheel set is close as possible without interference from the adjacent wheels. The wheel sets allow each of the channeled wheels to spin independently at different rates when needed.

Figure 15:
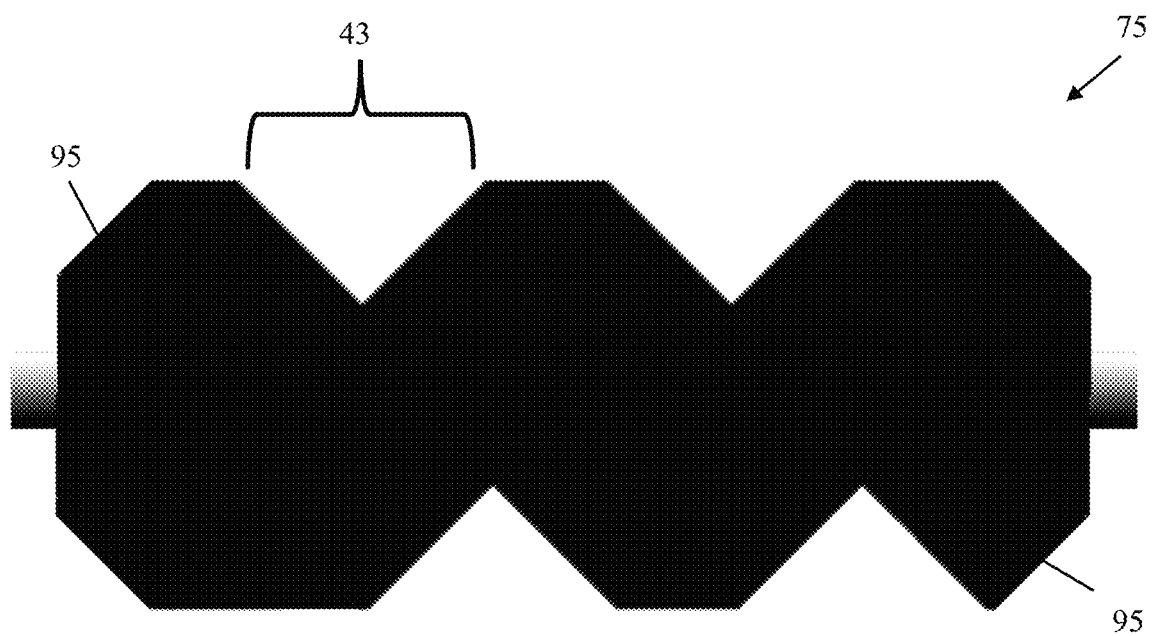
FIG. 15 illustrates a plan side view of the sinusoidal wheel, according to an aspect.

While each set is shown to have a flat end surface as a wheel wall 71, which may be preferred to avoid added friction, the wheel sets may have sinusoidal end surfaces as when the integral blade wheel assembly may be cut along the sinusoidal edge 87, as shown in FIG. 15, and as it will be described when referring to FIG. 15. In an example, the wheel wall 71 may have the sinusoidal shape as long as the wheel sets are separated enough for each wheel to roll independently. Each wheel may move independently of each other, lowering the friction coefficient and giving greater maneuverability to the wheel set. A reduction in scrubbing of the wheels when turning may allow for less wear of the sinusoidal peripheral surface 3. The wheels may otherwise be close together, but not touch because it may impede the independent rotation of each wheel.

Figure 13:
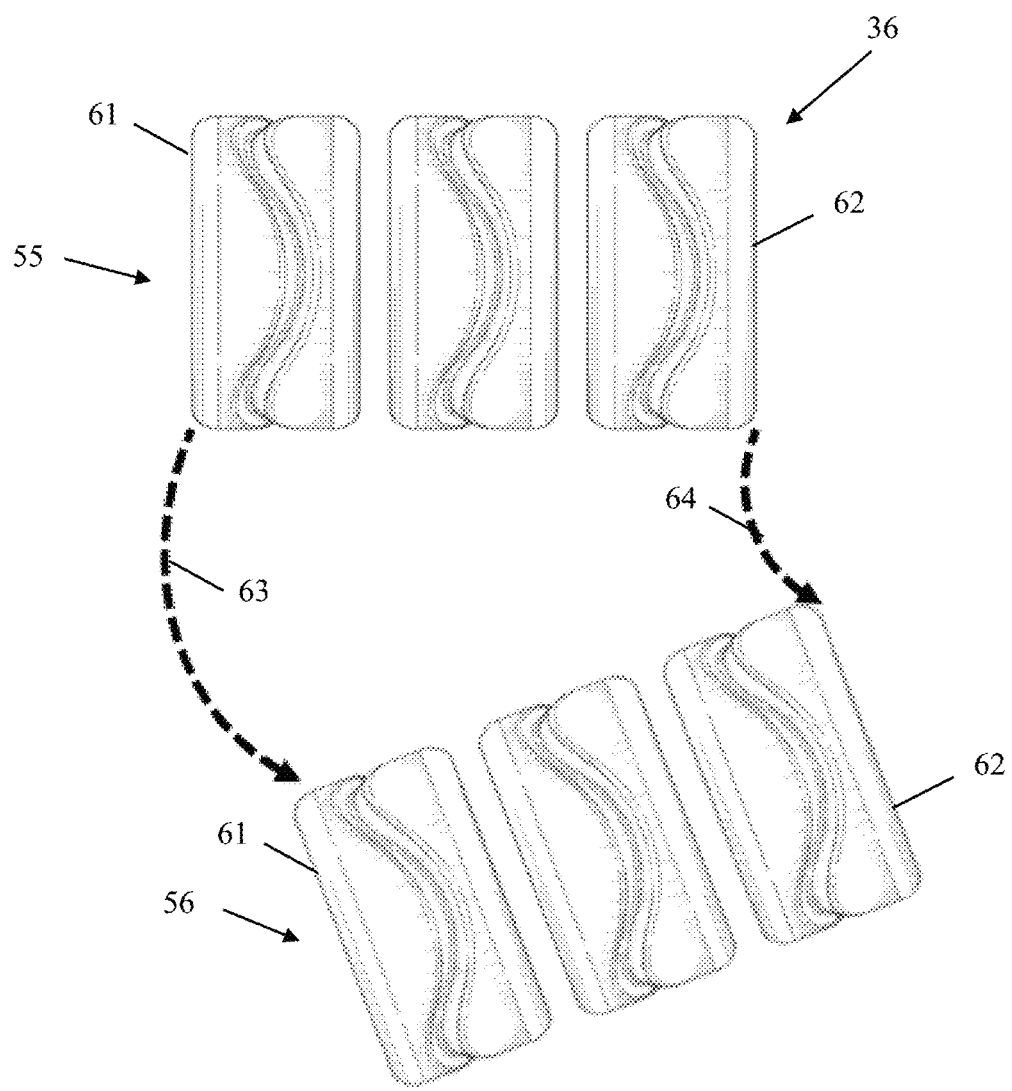
FIG. 13 illustrates the top plan view of a three-set wheel assembly turning, according to an aspect.

The wheel set assemblies comprised of multiple sinusoidal channeled wheels 75 may have the same benefits of the integral blade wheel assembly described herein. The modular aspect of the wheel set assemblies shown in FIG. 8-FIG. 12 may allow for more maneuverability when turning due to the channeled wheels 75 being able to spin independently of one another. FIG. 13 illustrates the top plan view of three-set wheel assembly 36 turning, according to an aspect. The divided wheel set may allow for each wheel set assembly to maneuver more easily because each wheel set can roll independently from the others. In position one 55 the three-set wheel assembly 36 may be stationary or moving in a straight path. In position two 56, three-set wheel assembly 36 has begun turning. The integral blade wheel assembly may be divided into wheel sets, which may allow for a reduction in drag and sliding when trying to maneuver the manual jack. The dividing into wheel sets may allow for the wheel set assembly to spin independently at different rates when needed, such as when turning. The independent spinning may allow for the outer channeled 61 wheel to have more rotations than the interior channeled wheel 62, which may prevent dragging and wear on the wheel set. The dividing of the integral wheel may also allow for tighter turns and more maneuverability because of the independent wheel rotations described herein.

As shown, the interior wheel 62 with respect to the turning direction would have less rotations than the exterior wheel 61 with respect to the turning direction. This may be due to while the wheel set assembly 36 is in the process of turning the interior wheel 62 travels a lesser distance 64 than the exterior wheel 61 travel distance 63 when they are separated channeled wheels. The separated channeled wheels or wheel set assembly 36 allows for the wheels to rotate independently, which may allow for less dragging and sliding that usually occurs when using the integral wheel assembly on the manual jack. For example, the most exterior wheel 61 would move independently to allow for better maneuverability because the exterior wheel 61 would rotate more due to the longer distance it may travel when turning.

Figure 14A:
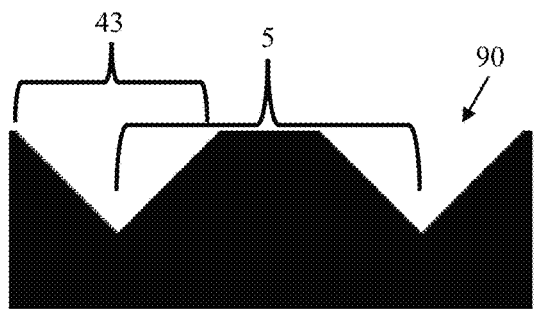
FIG. 14a-FIG. 14d illustrate cross section views of the sinusoidal channels, according to an aspect.
Figure 14B:
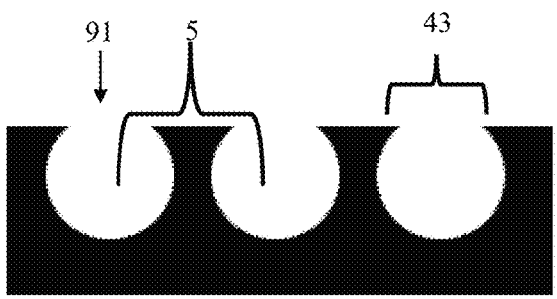
Figure 14C:
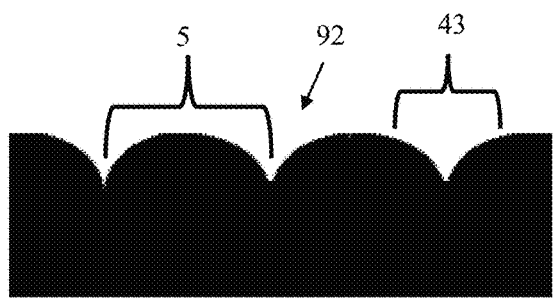
Figure 14D:
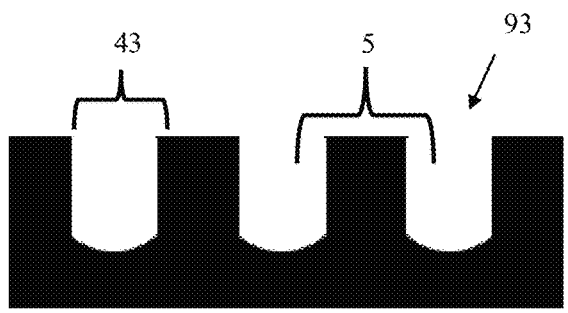

FIG. 14*a*-FIG. 14*d* illustrate cross section views of the sinusoidal channels 43, according to an aspect. FIG. 14*a*-FIG. 14*d* show the possible cross sections of the sinusoidal channels 43. FIG. 14*a* shows the sinusoidal channel 43 with a v-like shaped cross section 90. FIG. 14*b* shows the sinusoidal channel 43 with a circular-like shaped cross section 91. FIG. 14*c* shows the sinusoidal channel 43 with a modified v-like shaped cross section 92. FIG. 14*d* shows the sinusoidal channel 43 with a u-like shaped cross section 93. The v-like 90, u-like 93, and modified v-like 92 shaped cross sections may provide more support for the sinusoidal protrusion 5, while the circular-like 91 shaped cross section may provide better air flow and may move debris better because of the larger and concaved channel.

For example, the v-like 90, u-like 93, and modified v-like 92 shaped cross sections may be molded from a hard polyurethane meaning the sinusoidal protrusion 5 would need a wider base to have more structural support. The v-like 90, u-like 93, and modified v-like 92 shaped cross sections also may be easier to manufacture when molding because of the shape of the protrusion being easily removed from their molds. The circular-like 91 shaped cross section may be machined or carved from a harder material (i.e., metal) meaning the wider protrusion base may not be needed. For example, the sinusoidal channeled wheel 75 may be a solid metal material with the sinusoidal channels 43 carved into the material to produce the various shaped channels mentioned herein.

FIG. 15 illustrates a plan side view of the sinusoidal channeled wheel 75, according to an aspect. The sinusoidal channeled wheel 75 may have flat ends or sinusoidal ends as described herein. The sinusoidal channeled wheels 75 may also have an angled or chamfered end 95. The ends of the sinusoidal channeled wheel 75 may depend on the spacing between wheels, the heat dissipation each configuration provides, and the friction of the adjacent wheels within a set.

The chamfered end 95 on the sinusoidal channeled wheel 75 may be made by cutting along the partial segment of a sinusoidal channel 43. The chamfered end 95 on the sinusoidal channeled wheel 75 may also be made by trimming the flat ends to have a chamfered angle, as shown in FIG. 15. The chamfered ends 95 on the sinusoidal channeled wheel 75 may allow for more heat dissipation because the ends have a similar shape to a channel. More specifically, when two sinusoidal channeled wheels 75 with chamfered ends 95 are in a set the adjacent wheel ends would provide a channel like shape which may hold the same benefits as described herein. The chamfered end 95 may reduce friction between wheels within the wheel set and it may also reduce the wheel weight without interfering with the structural integrity of the wheel.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A wheel set assembly for a materials handling equipment comprising a plurality of sinusoidal channeled wheels, each of the plurality of sinusoidal channeled wheels having a channel disposed on a circular exterior surface and defined by a plurality of radially extending protrusion sides facing each other as each protrusion side in its entirety extends circumferentially in a sinusoidal pattern therein forming the channel, the channel having a peak and a valley adapted to form a sinusoidal shape, a bottom having a first width and a top having a second width, wherein a channel width varies within a space between the first width and the second width, and a peripheral surface adjacent to the channel forming a sinusoidal edge, wherein the peripheral surface is an outer most ground engaging circumference of the wheel formed from the axial distance from one protrusion side to the other, and each of the plurality of sinusoidal channeled wheels are adapted to be aligned coaxially and immediately next to one another without interference from adjacent wheels wherein the peripheral surface is at a constant radial distance from an axis of rotation such that the center point of the wheel oscillates with respect to the peripheral surface along the axis of rotation of the wheel due to said sinusoidal pattern.

2. The wheel set assembly of claim 1, wherein the second width is larger than the first width.

3. The wheel set assembly of claim 1, wherein the second width is equal to the first width.

4. The wheel set assembly of claim 1, wherein each of the plurality of sinusoidal channeled wheels have an axial core, the axial core extending over the length of each of the plurality of sinusoidal channeled wheels.

5. The wheel set assembly of claim 1, wherein the channel is integral to each of the plurality of sinusoidal channeled wheels.

6. The wheel set assembly of claim 1, wherein the channel is disposed in parallel to a second channel.

7. The wheel set assembly of claim 1, wherein the wheel set assembly is adapted for mounting in a forklift.

8. A monolithic load bearing wheel for a materials handling equipment comprising:
   a sinusoidal channel defined by a sinusoidal bottom and two top sinusoidal edges, wherein the two top sinusoidal edges are parallel to each other and is disposed on a circular exterior surface along a central axial core; and
   a peripheral surface adjacent to each top sinusoidal edge, wherein the peripheral surface is an outer most circumference of the wheel wherein the peripheral surface is at a constant radial distance from an axis of rotation such that the center point of the wheel oscillates with respect to the peripheral surface along the axis of rotation of the wheel due to the shape of the peripheral surface as formed by said sinusoidal channel.

9. The wheel of claim 8, the wheel is adapted for mounting in a forklift.

10. The wheel of claim 8, wherein the sinusoidal channel is disposed in parallel to a second sinusoidal channel.

11. The wheel of claim 8, wherein the sinusoidal channel is integral to the wheel.

12. A monolithic wheel for a materials handling equipment comprising:

a plurality of sinusoidal channels, each of the plurality of sinusoidal channels having a peak and a valley adapted to form a sinusoidal shape, a bottom having a first width and a top having a second width, and are disposed on a circular exterior surface along a central axial core; and a peripheral surface adjacent to each of the plurality of sinusoidal channels to form a sinusoidal edge, wherein the peripheral surface is an outer most circumference of the wheel wherein the peripheral surface is at a constant radial distance from an axis of rotation such that the center point of the wheel oscillates with respect to the peripheral surface along the axis of rotation of the wheel due to the shape of the peripheral surface as formed by said sinusoidal channels.

13. The wheel of claim 12, wherein the central axial core extends over the length of the wheel longitudinally.

14. The wheel of claim 12, wherein the second width is larger than the first width.

15. The wheel of claim 12, wherein the wheel is adapted for mounting in a forklift.

16. The wheel of claim 12, wherein each of the plurality of sinusoidal channels are spaced an equal distance apart.

17. The wheel of claim 12, wherein the wheel has a chamfered end.

* * * * *